(12) United States Patent
Stephan

(10) Patent No.: US 8,480,030 B2
(45) Date of Patent: Jul. 9, 2013

(54) STRUCTURAL COMPONENT AND METHOD FOR STIFFENING AN EXTERNAL SKIN

(75) Inventor: Andreas Stephan, Fredenbeck (DE)

(73) Assignee: Airbus Operations GmbH, Hamburg (DE)

( * ) Notice: Subject to any disclaimer, the term of this patent is extended or adjusted under 35 U.S.C. 154(b) by 256 days.

(21) Appl. No.: 12/678,732

(22) PCT Filed: Jun. 10, 2008

(86) PCT No.: PCT/EP2008/057210
§ 371 (c)(1),
(2), (4) Date: May 5, 2010

(87) PCT Pub. No.: WO2009/037005
PCT Pub. Date: Mar. 26, 2009

(65) Prior Publication Data
US 2010/0237195 A1    Sep. 23, 2010

Related U.S. Application Data

(66) Substitute for application No. 60/973,291, filed on Sep. 18, 2007.

(30) Foreign Application Priority Data

Sep. 18, 2007  (DE) .......................... 10 2007 044 386

(51) Int. Cl.
*B64C 1/00* (2006.01)
(52) U.S. Cl.
USPC .................. 244/119; 244/131; 244/117 R
(58) Field of Classification Search
USPC ................ 244/119, 120, 123.1, 123.7, 123.8, 244/117 R, 131
See application file for complete search history.

(56) References Cited

U.S. PATENT DOCUMENTS

| | | | | |
|---|---|---|---|---|
| 5,242,523 | A | * | 9/1993 | Willden et al. ............... 156/285 |
| 6,766,984 | B1 | | 7/2004 | Ochoa |
| 2005/0263645 | A1 | * | 12/2005 | Johnson et al. ............... 244/119 |
| 2006/0231682 | A1 | | 10/2006 | Sarh |

FOREIGN PATENT DOCUMENTS

| | | |
|---|---|---|
| CN | 1305921 | 8/2001 |
| CN | 1906083 | 1/2007 |
| DE | 19844035 | 11/1999 |
| EP | 1216816 | 2/2007 |
| WO | 02/083389 | 10/2002 |

* cited by examiner

*Primary Examiner* — Timothy D Collins
*Assistant Examiner* — Nicholas McFall
(74) *Attorney, Agent, or Firm* — Occhiuti Rohlicek & Tsao LLP

(57) ABSTRACT

The present invention provides a structural component for an aircraft or a space craft having an outer skin and a first reinforcing element which runs on the outer skin along a first spatial direction. A second reinforcing element runs over the first reinforcing element in a second spatial direction. A foot element supports the second reinforcing element on the outer skin, the foot element having a feed-through opening in which the first reinforcing element is held in a positive manner. From another point of view, a method is provided for reinforcing an outer skin of an aircraft or space craft, in which a first reinforcing element is attached to the outer skin along a first spatial direction. A foot element having a feed-through opening is attached over the first reinforcing element such that the first reinforcing element is held positively in the feed-through opening. A second reinforcing element is attached to the foot element in a second spatial direction over the first reinforcing element.

18 Claims, 3 Drawing Sheets

STRUCTURAL COMPONENT AND METHOD FOR STIFFENING AN EXTERNAL SKIN

CROSS-REFERENCE TO RELATED APPLICATIONS

This application is the National Stage of International Application No. PCT/EP2008/057210, filed on Jun. 10, 2008, which claims the benefit of the priority date of German Patent Application No. 10 2007 044 386.4, filed on Sep. 18, 2007 and the benefit of the priority date of U.S. Provisional Patent Application No. 60/973,291, filed Sep. 18, 2007. The contents of all the foregoing applications are hereby incorporated by reference in their entirety.

The present invention relates to a structural component for an aircraft or space craft, and also to a method for reinforcing an outer skin of an aircraft or space craft.

Although the present invention and the problem on which it is based can be applied to any light-weight components, they will be described in more detail with respect to a fuselage hull of an aircraft.

Fuselage shells for aircraft are usually produced in so-called lightweight construction from an outer skin which is reinforced on the inside by a two-dimensional structure consisting of stringers running in the longitudinal direction of the aircraft and formers running in the transverse direction as reinforcing elements. Conventional profile cross sections for stringers are, for example Z-shaped cross sections with semi-circular flanges, pure Z profiles or T profiles which can be provided with thickenings at the end of the web forming the bar of the "T". Particularly in the region of windows or a longitudinal seam in the outer skin, special shapes, for example stringers with a profile termed a walking stick profile, similar to an upside-down "J" are also used.

The stringers mainly absorb loads in the longitudinal direction and are connected to the outer skin by riveting or bonding. Tensile loads mainly prevail on the stringer in the upper region of the aircraft, while compressive loads primarily prevail in the lower region. If the stringer is loaded in compression, it tends to bend away laterally. This could be compensated by a sufficiently large cross section, but in aircraft construction this has a seriously adverse effect on the flying weight and is therefore undesirable.

The stringers are conventionally supported in regular spacings by support brackets to prevent them from bending when loaded in compression. For example, support brackets are provided at each point of intersection of a stringer with a former, approximately as a pure support bracket configured as a separate component or also as an angle configured integrally with a clip bearing the former. Support brackets of this type each support a former and a stringer against one another at their common point of intersection. However, such support brackets also increase the flying weight and also demand a considerable construction and assembly expense. Thus, for example support brackets of different shapes and geometries have to be kept available, since inside an aircraft the shapes and intersection angles of stringers and formers vary.

It is therefore the object of the present invention to provide an improved support of the stringers which, with a low weight, reliably prevents the stringers from bending.

According to the invention, this object is achieved by a structural component which has the features of claim 1, an aircraft or space craft having the features of claim 13, or by a method for reinforcing the outer skin of an aircraft or space craft having the features of claim 14.

The idea on which the present invention is based is to dispense with a support bracket, as in the conventional construction method it supports against one another, at their point of intersection, a first reinforcing element and a second reinforcing element which runs over the first reinforcing element at points of intersection where a sufficient support of the second reinforcing element, for example a former, is already ensured in another manner, for example where the second reinforcing element is connected to further components and is supported thereby. The support of the first reinforcing element running under the second reinforcing element is achieved at such intersection points in that a feed-through opening for guiding through the first reinforcing element under the second reinforcing element is provided in a foot element which supports the second reinforcing element on the outer skin, the feed-through opening being configured such that it holds the first reinforcing element in a positive manner.

Since it is possible in this manner to reduce the number of support brackets used in an aircraft and, in so doing, to reliably support the first reinforcing elements running on the outer skin, for example stringers, by positive locking, a reduction in the flying weight of the aircraft is achieved without impairing its stability. Furthermore, the invention makes it possible to reduce the number of different parts which are required, i.e. support brackets of different geometries and thus to lower production and storage costs. Expensive mounting steps, such as riveting the support brackets to the reinforcing elements are also omitted.

Advantageous embodiments and improvements of the invention are provided in the subclaims.

According to a preferred development, the feed-through opening secures the first reinforcing element in a positive manner against bending away laterally. This is advantageous, as the first reinforcing element can be loaded in compression without bending away laterally.

According to a preferred development, the foot element is configured integrally with the second reinforcing element, for example in the manner of a so-called integral former. This has the advantage of reducing the number of necessary parts and the assembly costs.

Alternatively, the foot element and the second reinforcing element are riveted together which is advantageous, because in this manner, formers of a uniform construction for example can be adapted to different substructures by modified foot elements.

According to a preferred development, a spacer is inserted between the first reinforcing element and the foot element. This measure prevents the first reinforcing element and the foot element of the second reinforcing element from contacting one another at the edge of the feed-through opening. This prevents damage to the surfaces and subsequent corrosion.

According to a preferred development, the spacer comprises a plastics material, in particular a thermoplastic material. This has the advantage that the first reinforcing element is held in a flexible manner so that for example vibrations of the reinforcing elements are absorbed, which leads, inter alia, to reduced acoustic emissions.

According to a preferred development, the length of the spacer is not less than a width of a foot portion of the foot element. In this manner, the spacer and thus indirectly the first reinforcing element are also held securely if the second reinforcing element inclines slightly, for example as the result of a heavy load.

According to a preferred development, the thickness of the spacer is not less than a thickness of the first reinforcing element. This ensures sufficient inherent stability of the spacer.

According to a preferred development, the spacer is held in a positive manner on the first reinforcing element. This is particularly advantageous, because in this manner the spacer does not need to be attached to the first reinforcing element or the foot element by riveting or by other attachment means.

According to a preferred development, the spacer has a nose which rests in a correspondingly formed opening in the first reinforcing element. This measure prevents the spacer from sliding along the first reinforcing element and from thus being removed out of the feed-through opening.

According to a preferred development, the first reinforcing element has a profile arm. The spacer has a hooked moulded-on part which is hooked around the profile arm. This measure prevents the spacer from sliding transversely to the first reinforcing element and from thus being removed out of the feed-through opening.

According to a preferred development, the spacer has a groove into which the foot element is inserted. This prevents the spacer from moving along the first reinforcing element.

In the following, the invention will be described in detail on the basis of embodiments with reference to the accompanying drawings, in which FIG. 1 is a perspective view of a structural component according to an embodiment of the invention;

In the figures, the same reference numerals denote the same or functionally identical components, unless stated otherwise.

Figure 1:
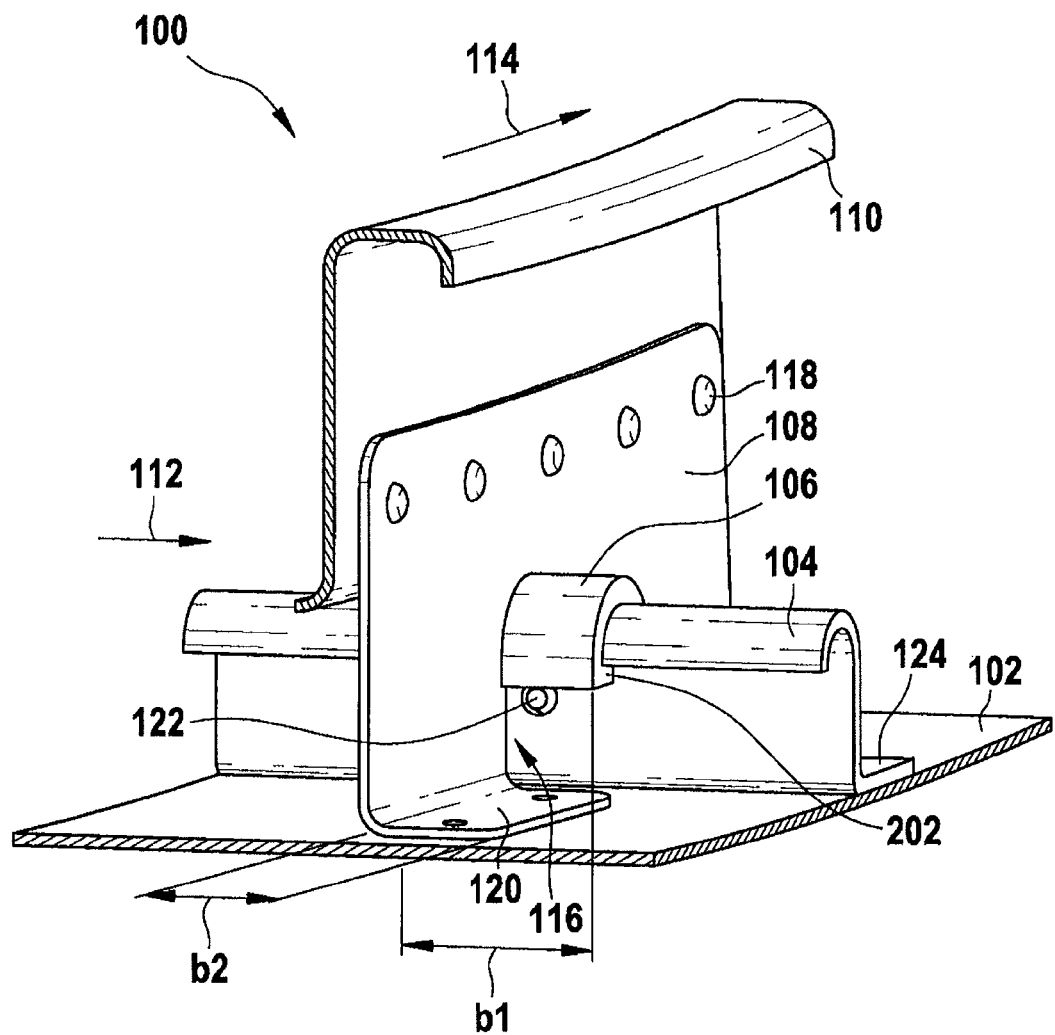

FIG. 1 is a perspective view of a structural component 100 of an aircraft which includes a section of the outer skin 102 of the aircraft fuselage, viewed towards the inside of the outer skin 102. Running on the outer skin in longitudinal direction 112 of the aircraft is a stringer 104 as a first reinforcing element 104 reinforcing the outer skin in the longitudinal direction 112. The stringer 104 has a so-called walking stick profile which is bonded or riveted with a flat foot portion 124 on the outer skin 102 and its upper end is curved like the handle of a walking stick. Stringer 104 and/or outer skin 102 can be produced from the same or different materials, for example aluminium, carbon fibre reinforced plastics or other composite materials.

A spacer 106 of length b1 is attached positively to the stringer 104 at the upper end of the stringer profile 104. The spacer is produced, for example as an injection moulded part from a durable plastics material and has a profile, the lower side of which follows the curvature of the upper side of the stringer 104. A hooked moulded-on part 202 on one end of the profile of the spacer 106 is hooked around the free end 200 of the walking stick profile of the stringer 104. The spacer extends away from the hooked moulded-on part 202 over the curvature of the walking stick profile to the opposing side of the stringer 104 remote from the observer. Here it follows the further vertically extending profile of the stringer 104 downwards and terminates above the stringer foot 124 without contacting it. Configured in the region of the spacer following the walking stick profile vertically downwards, on the side facing the stringer 104 is a cylindrical nose 122 which rests in a hole configured in a suitable place in the stringer 104. The hooked moulded-on part hooked around the walking stick profile of the stringer 104 and the cylindrical nose 122 resting in the hole attach the spacer positively on the stringer 104 and prevent it from moving in any direction.

Running above the stringer 104 in a substantially vertical direction 114 to the longitudinal direction 112 of the aircraft is a former 110 with a Z profile as a second reinforcing element 110 which reinforces the outer skin 102. The former 110 is connected to the outer skin 102 by a separate foot element 108 or by clips 108. The foot element 108 has a foot region 120 which is bent at a right angle, has a width b2 and in which it is riveted to the outer skin 102. At the upper end of the foot element 108, rivets 118 connect the foot element 108 to the former 110.

Configured at the intersection point between former 110 and stringer 104 in the foot element 108 is a door-like feed-through opening 116, through which the stringer 104 is guided under the foot element 108 and under the former 110 supported by said foot element 108. In its upper portion, the feed-through opening 116 has an inner contour which is formed corresponding to the outer contour of the spacer 106 such that the outer surface of the spacer 106 and the inner edge of the door-like feed-through opening 116 contact one another in an exactly fitting manner. The stringer 104 is thus held positively by the feed-through opening 116 in the foot element 108, such that when loaded in compression in the longitudinal direction 112 of the aircraft, it cannot bend away in a lateral direction 114. In this respect, the spacer 106 prevents the surfaces of stringer 104 and foot element from possibly suffering damage due to mutual friction and vibrations.

Figure 2:
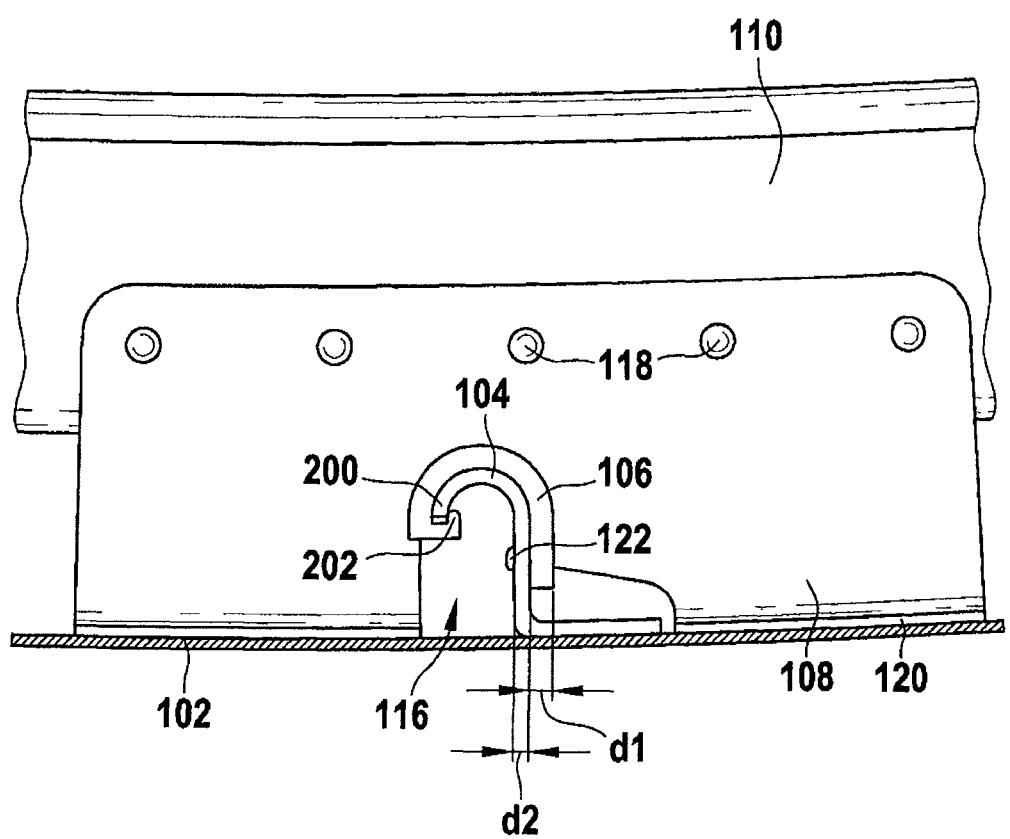
FIG. 2 is a side view of the structural component from FIG. 1.

The geometric arrangement of the components with respect to one another is further illustrated by FIG. 2 which is a side view of the structural component of FIG. 1, viewed from the right-hand side as shown in FIG. 1, parallel to the longitudinal direction of the aircraft. The figure clearly shows in particular the positive mounting of the spacer 106 on the stringer 104 without additional attachment elements which is achieved by cooperation between the hooked moulded-on part 202 and the nose 122. If the spacer 106 is produced from a resilient plastics material, it can be mounted in an extremely simple and rapid manner by hooking the hooked moulded-on part into the walking stick profile of the stringer 104 and then resiliently snapping the nose 122 into the hole to be previously made at the point of intersection between the stringer 104 and the former 110.

As can be seen, the spacer 106 follows the shape of the stringer profile 104 with a constant thickness d1 which was selected to be approximately the same size or greater than the thickness d2 of the stringer profile 104. The shape of the feed-through opening 116 in the foot element 108 in turn follows the outer contour of the spacer 106. Alternatively, a groove 302 can optionally be configured in the spacer 106, which groove 302 accommodates the edge of the feed-through opening 116.

Figure 3:
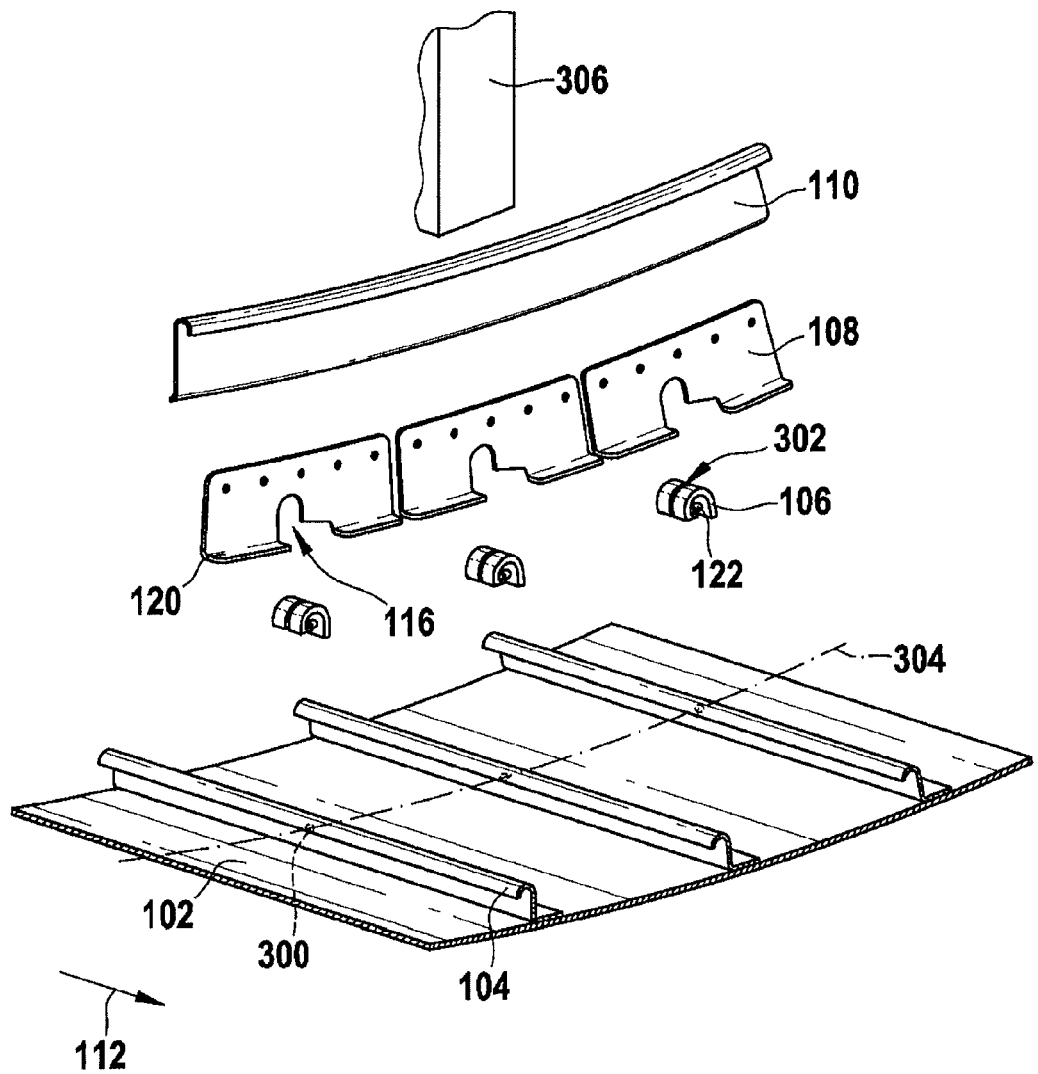
FIG. 3 is an exploded view of a structural component according to a further embodiment.

An assembly method for structural components of this type will be described in the following with reference to FIG. 3 which is an exploded view of a structural component according to a further embodiment. First of all, the inside of the outer skin 102 of an aircraft fuselage portion is reinforced by stringers 104 which run at regular intervals in the longitudinal direction of the aircraft in that the stringers 104 are riveted or bonded to the outer skin 102. It is also possible for the outer skin 102 and the stringers 104 to be configured integrally, for example as a composite fibre component 102, 104.

Subsequently, holes 300 are made respectively in the stringers 104 along a line 304 running substantially vertically to the longitudinal direction 112 of the aircraft. A spacer 106 is suspended in each stringer 104. A light pressure on the respective spacer causes it to deform elastically until the moulded-on nose 122 snaps into the respective hole 300.

In a further step, foot elements 108 which, as shown, can be configured as separate clips 108 or as a thrust vane which extends over a plurality of stringers 104, are pushed over the spacers 106. If the spacers have a notch 302, as shown here, the edge of the feed-through openings provided in the foot elements 108 is inserted into the respective notch 302. The foot elements 108 are then riveted by their respective foot portions 120 on the outer skin 102. In a final step, the former 110 is attached to the foot elements 108 by riveting.

In particular, stringers 104 can be supported in regions of the outer skin 102 in the illustrated manner, in which regions the former 100 is connected to further primary structural components 306 and is supported thereby, so that a separate support of the former in this location is no longer necessary. Primary structural components 306 of this type can be, for example transverse bars, floor supporting bars, the cargo compartment floor or various supports thereof.

Although the present invention has presently been described on the basis of preferred embodiments, it is not restricted thereto, but can be modified in many different ways.

For example, stringers of different profile types can be used, in which case the spacers can be configured according to the respective profile shape and can be provided in a suitable location with hooked moulded-on parts and noses.

LIST OF REFERENCE NUMERALS 100 structural component
102 outer skin
104 first reinforcing element
106 spacer
108 foot element
110 second reinforcing element
112 first spatial direction
114 second spatial direction
116 feed-through opening
118 rivets
120 foot portion
122 nose
200 profile arm
202 hooked moulded-on part
300 opening
302 groove
304 line of assembly of former
306 primary structural component

The invention claimed is:

1. A structural component for an aircraft or space craft, said structural component comprising:
    an outer skin;
    a first reinforcing element that runs on the outer skin along a first spatial direction;
    a second reinforcing element that runs over the first reinforcing element in a second spatial direction; and
    a foot element that supports the second reinforcing element on the outer skin, said foot element having a feed-through opening in which the first reinforcing element is held, a spacer being inserted between the first reinforcing element and the foot element, wherein an upper portion of the feed-through opening has an inner contour which is formed corresponding to the outer contour of the spacer such that the outer surface of the spacer and the inner edge of the feed-through opening contact one another in an exactly fitting manner, so that the first reinforcing element is held by the feed-through opening in the foot element.

2. The structural component according to claim 1, wherein the feed-through opening prevents the first reinforcing element in a positive manner from bending away laterally.

3. The structural component according to claim 1, wherein the foot element is configured integrally with the second reinforcing element.

4. The structural component according to claim 1, wherein the foot element and the second reinforcing element are riveted together.

5. The structural component according to claim 1, wherein the spacer comprises a plastics material, in particular a thermoplastic material.

6. The structural component according to claim 1, wherein the spacer has a length (b1) that is not less than a width (b2) of a foot portion of the foot element.

7. The structural component according to claim 1, wherein the spacer has a thickness (d1) that is not less than a thickness (d2) of the first reinforcing element.

8. The structural component according to claim 1, wherein the spacer is held on the first reinforcing element.

9. The structural component according to claim 1, wherein the spacer has a nose that rests in a correspondingly shaped opening in the first reinforcing element.

10. The structural component according to claim 1, wherein the first reinforcing element has a profile arm, and the spacer has a hooked moulded-on part that is hooked around the profile arm.

11. The structural component according to claim 1, wherein the spacer has a groove into which the foot element is inserted.

12. An aircraft or space craft having a structural component according to claim 1.

13. A method for reinforcing an outer skin of an aircraft or space craft, said method comprising:
    attaching a first reinforcing element to the outer skin along a first spatial direction;
    attaching a foot element having a feed-through opening over the first reinforcing element such that the first reinforcing element is held in the feed-through opening;
    inserting a spacer between the first reinforcing element and the foot element, wherein an upper portion of the feed-through opening has an inner contour which is formed corresponding to the outer contour of the spacer such that the outer surface of the spacer and the inner edge of the feed-through opening contact one another in an exactly fitting manner, so that the first reinforcing element is held by the feed-through opening in the foot element; and
    attaching a second reinforcing element to the foot element over the first reinforcing element in a second spatial direction.

14. The method according to claim 13, wherein inserting the spacer comprises hooking a hooked moulded-on part of the spacer around a profile arm of the first reinforcing element.

15. The method according to claim 13, wherein inserting the spacer comprises introducing a nose of the spacer into an opening in the first reinforcing element.

16. The method according to claim 15, further comprising drilling the opening into the first reinforcing element.

17. The method according to claim 13, further comprising introducing the foot element into a groove in the spacer.

18. The method according to claim 13, wherein attaching the second reinforcing element comprises riveting the second reinforcing element to the foot element.

* * * * *